United States Patent Office 3,185,540
Patented May 25, 1965

3,185,540
METHOD OF REMOVING CARBON MONOXIDE FROM GAS MIXTURES
Donald W. Breck, Tonawanda, N.Y., Charles R. Castor, Homewood, Ill., and Robert M. Milton, Buffalo, N.Y., assignors to Union Carbide Corporation, a corporation of New York
No Drawing. Filed Dec. 18, 1961, Ser. No. 160,316
7 Claims. (Cl. 23—2)

This invention relates to a method for removing small amounts of a material selected from the group consisting of oxygen and carbon monoxide from a gas mixture. More particularly, this invention relates to a method for removing small amount of oxygen or carbon monoxide from a gas mixture by contact with crystalline zeolitic molecular sieves.

The principal object of the present invention is to provide an improved method for removing small amounts of oxygen or carbon monoxide from a gas mixture.

Other objects will be apparent from the subsequent disclosure and appended claims.

These objects are achieved by contacting the gas mixture containing small amounts of a material selected from the group consisting of oxygen and carbon monoxide with a crystalline zeolitic molecular sieve containing in the inner adsorption region at least one material selected from the group consisting of elemental iron, nickel and cobalt. Such contact results in an oxygen or carbon monoxide depleted gas mixture.

Zeolitic molecular sieves, both natural and synthetic, are metal aluminosilicates. The crystalline structure of these materials is such that a relatively large adsorption area is present inside each crystal. Access to this area may be had by way of openings, or pores, in the crystal. Molecules are selectively adsorbed by molecular sieves on the basis of their size and polarity, among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied will be available for adsorption of molecules having a size, shape, and energy which permits entry of the adsorbate molecules into the pores of the molecular sieves.

The zeolitic molecular sieves to be useful in the present invention, must be capable of adsorbing oxygen molecules at the normal boiling point of oxygen. Included among these are the preferred natural zeolitic molecular sieves, chabazite, faujasite, erionite, mordenite, gmelinite, and the calcium form of analcite, and the preferred synthetic zeolitic molecular sieves, zeolite A, D, L, R, S, T, X and Y. The natural materials are adequately described in the chemical art. The characteristics of the synthetic materials and processes for making them are provided below.

The general formula for zeolite X, expressed in terms of mol fractions of oxides, is as follows:

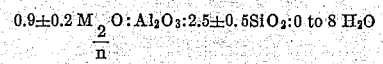

In the formula "M" represents a cation, for example hydrogen or a metal, and "n" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9\ Na_2O : Al_2O_3 : 2.5\ SiO_2 : 6.1\ H_2O$$

The major lines in the X-ray diffraction pattern of zeolite X are set forth in Table A below.

TABLE A

| $d$ value of reflection in A.: | $100I/I_0$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the K-alpha doublet of copper, and a Geiger counter spectrometer with a strip chart pen recorder was used. The peak heights I and the positions as a function of $2\theta$, where $\theta$ is the Bragg angle, were read from the spectrometer charge. From these, the relative intensities, $100I/I_0$, where $I_0$ is the intensity of the strongest line or peak, and $d$ (obs.), the interplanar spacing in A., corresponding to the recorded lines were calculated. The X-ray patterns indicate a cubic unit cell of dimensions between 24.5A. and 25.5A.

To make sodium zeolite X, reactants are mixed in aqueous solution and held at about 100° C., until the crystals of zeolite X are formed. Preferably the reactants should be such that in the solution the following ratios prevail:

| | |
|---|---|
| $SiO_2/Al_2O_3$ | 3–5 |
| $Na_2O/SiO_2$ | 1.2–1.5 |
| $H_2O/Na_2O$ | 35–60 |

The general formula for zeolite A, expressed in terms of mol fractions of oxides is as follows:

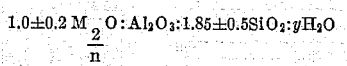

In the formula, "M" represents a cation, for example hydrogen or a metal, and "n" its valence, and "y" may be any value up to 6. The zeolite is activated, or made capable of adsorbing certain molecules by the removal of water from the crystal, as by heating. Thus the actual number of mols of water present in the crystal will depend upon the degree of dehydration or activation of the crystal.

As in the case of zeolite X, the cation represented in the formula by the letter "M" can be changed by conventional ion-exchange techniques. For purposes of convenience the sodium form of zeolite A, designated sodium zeolite A, is synthesized and other forms obtained by the modification of the sodium zeolite A.

A typical formula for sodium zeolite A is $$0.99\ Na_2O : 1.0\ Al_2O_3 : 1.85\ SiO_2 : 5.1\ H_2O$$

The major lines in the X-ray diffraction pattern of zeolite A are set forth in Table B below.

TABLE B

| $d$ value of reflection in A: | $100I/I_0$ |
|---|---|
| 12.2±0.2 | 100 |
| 8.6±0.2 | 69 |
| 7.05±0.15 | 35 |
| 4.07±0.08 | 36 |
| 3.68±0.07 | 53 |
| 3.38±0.06 | 16 |
| 3.26±0.05 | 47 |
| 2.96±0.05 | 55 |
| 2.73±0.05 | 12 |
| 2.60±0.05 | 22 |

The same procedures and techniques were employed in obtaining the patterns described in Tables A and B.

To make sodium zeolite A, reactants are mixed in aqueous solution and heated at about 100° C. until the crystals of zeolite A are formed. Preferably the reactants should be such that in the solution the following ratios prevail:

| | |
|---|---|
| $SiO_2/Al_2O_3$ | 0.5–1.3 |
| $Na_2O/SiO_2$ | 1.0–3.0 |
| $H_2O/Na_2O$ | 35–200 |

The chemical formula for zeolite Y expressed in terms of oxides mole ratios may be written as $$0.9 \pm 0.2 \ Na_2O:Al_2O_3:wSiO_2:xH_2O$$

wherein "$w$" is a value greater than 3 up to about 5 and "$x$" may be a value up to about 9.

Zeolite Y has a characteristic X-ray powder diffraction pattern which may be employed to identify zeolite Y. The X-ray powder diffraction data are shown in Table C. The values for the interplanar spacing $d$ are expressed in angstrom units. The relative intensity of the lines of the X-ray powder diffraction data are expressed as VS, very strong; S, strong; M, medium; W, weak; and VW, very weak.

TABLE C

| hkl | $h^2+k^2+l^2$ | $d$ in A. | Intensity |
|---|---|---|---|
| 111 | 3 | 14.3–14.4 | VS. |
| 220 | 8 | 8.73–8.80 | M. |
| 311 | 11 | 7.45–7.50 | M. |
| 331 | 19 | 5.67–5.71 | S. |
| 333, 511 | 27 | 4.75–5.08 | M. |
| 440 | 32 | 4.37–4.79 | M. |
| 620 | 40 | 3.90–4.46 | W. |
| 533 | 43 | 3.77–3.93 | S. |
| 444 | 48 | 3.57–3.79 | VW. |
| 551, 711 | 51 | 3.46–3.48 | VW. |
| 642 | 56 | 3.30–3.33 | S. |
| 553, 731 | 59 | 3.22–3.24 | W. |
| 733 | 67 | 3.02–3.04 | M. |
| 660, 822 | 72 | 2.91–2.93 | M. |
| 55, 751 | 75 | 2.85–2.87 | S. |
| 840 | 80 | 2.76–2.78 | M. |
| 753, 911 | 83 | 2.71–2.73 | W. |
| 644 | 88 | 2.63–2.65 | M. |
| 931 | 91 | 2.59–2.61 | M. |
| 844 | 96 | 2.52–2.54 | VW. |
| 862; 10, 2, 0 | 104 | 2.42–2.44 | VW. |
| 666; 10, 2, 2 | 108 | 2.38–2.39 | M. |
| 775; 11, 1, 1 | 123 | 2.22–2.24 | VW. |
| 880 | 128 | 2.18–2.20 | W. |
| 955; 971; 11, 3, 1 | 131 | 2.16–2.18 | VW. |
| 973; 11, 3, 3 | 139 | 2.10–2.11 | W. |
| 884; 12, 0, 0 | 144 | 2.06–2.07 | VW. |
| 886; 10, 8, 0; 12, 4, 2 | 164 | 1.93–1.94 | VW. |
| 10, 8, 2 | 168 | 1.91–1.92 | VS. |
| 995; 13, 3, 3 | 187 | 1.81–1.82 | VW. |
| 11, 7, 5; 13, 5, 1 | 195 | 1.77–1.78 | VW. |
| 10, 8, 6; 10, 10, 0; 14, 2, 0 | 200 | 1.75–1.78 | W. |
| 997; 11, 9, 3 | 211 | 1.70–1.71 | W. |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

| | Range 1 | Range 2 | Range 3 |
|---|---|---|---|
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole ratios, falling within one of the following ranges:

| | Range 1 | Range 2 | Range 3 |
|---|---|---|---|
| $Na_2O/SiO_2$ | 0.6 to 1.0 | 1.5 to 1.7 | 1.9 to 21 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mole ratios of oxides, may be represented as follows:

$$1.0 \pm 0.1 \ M_{\frac{2}{n}}O:Al_2O_3:6.4 \pm 0.5 \ SiO_2:yH_2O$$

wherein "M" designates a cation, "$n$" represents the valence of "M"; and "$y$" may be any value from 0 to about 7.

The more significant $d$ (A.) values, i.e., interplanar spacings, for the major lines in the X-ring diffraction pattern of zeolite L, are given below in Table D.

TABLE D 16.1±0.3
7.52±0.04
6.00±0.02
4.57±0.03
4.35±0.04
3.91±0.02
3.47±0.02
3.28±0.02
3.17±0.01
3.07±0.01
2.91±0.01
2.65±0.01
2.46±0.01
2.42±0.01
2.19±0.01

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal aluminosilicate mixture having a composition, expressed in terms of mole ratios of oxides falling within the following range:

| | |
|---|---|
| $K_2O/(K_2O+Na_2O)$ | From about 0.33 to about 1 |
| $(K_2O+Na_2O)/SiO_2$ | From about 0.4 to about 0.5 |
| $SiO_2/Al_2O_3$ | From about 15 to about 28 |
| $H_2O/(K_2O+Na_2O)$ | From about 15 to about 41 | maintaining the mixture at a temperature of about 100° C. until crystallization occurs, and separating the crystals from the mother liquor.

The chemical formula for zeolite D may be written, in terms of oxides, as follows:

$$0.9 \pm 0.2[x\text{Na}_2\text{O}:(1-x)\text{K}_2\text{O}]:\text{Al}_2\text{O}_3:w\text{SiO}_2:y\text{H}_2\text{O}$$

wherein "$x$" is a value from 0 to 1, "$w$" is from about 4.5 to about 4.9, and "$y$," in the fully hydrated form, is about 7. In the preferred form of zeolite D, "$x$" is in the range of from 0.4 to 0.6.

Zeolite D has an X-ray powder diffraction pattern substantially like that shown in Table E.

TABLE E

*X-ray diffraction patterns of zeolite D*

[$d$=Interplanar spacing in A.:$I/I_0$ max.=relative intensity]

Zeolite D

| $d$, A.: | $I/I_0$ max. |
|---|---|
| 9.42 | 66 |
| 6.89 | 67 |
| 5.54 | 15 |
| 5.03 | 62 |
| 4.33 | 62 |
| 3.98 | 27 |
| 3.89 | 23 |
| 3.60 | 12 |
| 3.45 | 39 |
| 3.19 | 15 |
| 2.94 | 100 |
| 2.69 | 9 |
| 2.61 | 38 |
| 2.30 | 16 |
| 2.09 | 22 |
| 1.81 | 29 |
| 1.73 | 23 |

Zeolite D may be prepared as follows:

A sodium-potassium aluminosilicate-water mixture is prepared such that the initial composition of the reactant mixture in terms of oxide-mole-ratios is $$\frac{\text{Na}_2\text{O}+\text{K}_2\text{O}}{\text{SiO}_2}=0.45 \text{ to } 0.65$$

$$\frac{\text{Na}_2\text{O}}{\text{Na}_2\text{O}+\text{K}_2\text{O}}=0.74 \text{ to } 0.92$$

$$\frac{\text{SiO}_2}{\text{Al}_2\text{O}_3}=\text{about } 28$$

$$\frac{\text{H}_2\text{O}}{\text{Na}_2\text{O}+\text{K}_2\text{O}}=18 \text{ to } 45$$

The mixture is maintained at a temperature within the range of about 100° C. to 120° C. until crystals are formed; the crystals are then separated from the mother liquor.

The chemical formula for zeolite R may be written as:

$$0.9 \pm 0.2 \text{ Na}_2\text{O}:\text{Al}_2\text{O}_3:w\text{SiO}_2:x\text{H}_2\text{O}$$

wherein "$w$" is from 3.45 to 3.65 and "$x$," for the fully hydrated form, is about 7.

Zeolite R has an X-ray powder diffraction pattern substantially like that shown in Table F.

TABLE F

*X-ray diffraction patterns of zeolite R*

[$d$=Interplanar spacing in A.: $I/I_0$ max.=relative intensity]

ZEOLITE R

| $d$, A.: | $100(I/I_0$ max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

Zeolite R may be prepared as follows:

A sodium aluminosilicate-water mixture is prepared such that the initial composition of the reactant mixture, in terms of oxide-mole-ratios, falls within any one of the following seven ranges:

| | I | II | III | IV | V | VI | VII |
|---|---|---|---|---|---|---|---|
| Na$_2$O/SiO$_2$ | 0.20 to 0.40 | 0.41 to 0.60 | 0.61 to 0.80 | 0.81 to 1.0 | 0.81 to 1.0 | 1.7 to 1.9 | 1.2 to 1.4 |
| SiO$_2$/Al$_2$O$_3$ | about 4 | 3.5 to 6.0 | 3.5 to 6.5 | 3 to 4.5 | about 30 | 10 to 25 | about 6 |
| H$_2$O/Na$_2$O | 22 to 60 | 30 to 60 | 40 to 80 | 40 to 80 | 50 to 60 | 60 to 70 | 80 to 90 |

The mixture is maintained at a temperature with the range of about 100° C. to 120° C. until crystals are formed; the crystals are then separated from the mother liquor.

The chemical formula for zeolite S may be written as:

$$0.9 \pm 0.2 \text{Na}_2\text{O}:\text{Al}_2\text{O}_3:w\text{SiO}_2:x\text{H}_2\text{O}$$

wherein "$w$" is from 4.6 to 5.9 and "$x$," for the fully hydrated form, is from about 6 to 7.

Zeolite S has a characteristic X-ray powder diffraction pattern which may be employed to identify zeolite S. The X-ray powder diffraction data are shown in Table G.

TABLE G

*X-ray diffraction patterns of synthetic zeolite S*

[$d$=Interplanar spacing in A.: $I/I_0$ max.=relative intensity]

| $d$, A.: | $100(I/I_0$ max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |

TABLE G—Continued

| d, A.: | 100($I/I_0$ max.) |
|---|---|
| 2.603 | 39 |
| 2.126 | 11 |
| 2.089 | 39 |
| 1.910 | 12 |
| 1.809 | 40 |
| 1.722 | 32 |

Zeolite S may be prepared by preparing a sodium aluminosilicate-water mixture such that the composition of the reactant mixture, in terms of oxide-mole ratios, falls within the following range when the source of silica is an aqueous colloidal silica sol:

| $Na_2O/SiO_2$ | 0.3 to 0.6 |
|---|---|
| $SiO_2/Al_2O_3$ | 6 to 10 |
| $H_2O/Na_2O$ | 20 to 100 | and falls within the following range when the source of silica is sodium silicate:

| $Na_2O/SiO_2$ | About 0.5 |
|---|---|
| $SiO_2/Al_2O_3$ | About 25 |
| $H_2O/Na_2O$ | About 18 | maintaining the mixture at a temperature in the range of from about 80° C. up to about 120° C., preferably at about 100° C., and at a pressure at least equal to the vapor pressure of water in equilibrium with the mixture of reactants until crystals are formed, and separating the crystals from the mother liquor.

The chemical formula for Zeolite T may be written, in terms of mole ratios of oxides, as follows:

$$1.1 \pm 0.4[xNa_2O:(1-x)K_2O]:Al_2O_3:6.9 \pm 0.5SiO_2 \cdot yH_2O$$

wherein "$x$" may be any value from about 0.1 to about 0.8, and "$y$" may be any value from about 0 to about 8. Zeolite T may be identified and distinguished from other zeolites, and other crystalline substances, by its X-ray powder diffraction pattern. The data which are set forth below in Table H are for a typical example of zeolite T.

TABLE H

| Bragg angle $2\theta$ | Interplanar spacing d (A.) | Relative intensity 100$I/I_0$ |
|---|---|---|
| 7.72 | 11.45 | 100 |
| 9.63 | 9.18 | 4 |
| 11.74 | 7.54 | 13 |
| 13.35 | 6.63 | 54 |
| 14.74 | 6.01 | 2 |
| 15.44 | 5.74 | 6 |
| 17.78 | 4.99 | 2 |
| 19.43 | 4.57 | 8 |
| 20.46 | 4.34 | 45 |
| 21.35 | 4.16 | 3 |
| 21.78 | 4.08 | 2 |
| 23.27 | 3.82 | 16 |
| 23.64 | 3.76 | 56 |
| 24.28 | 3.67 | 1 |
| 24.82 | 3.59 | 30 |
| 26.04 | 3.42 | 2 |
| 26.92 | 3.31 | 16 |
| 28.04 | 3.18 | 12 |
| 28.29 | 3.15 | 18 |
| 30.47 | 2.93 | 11 |
| 31.15 | 2.87 | 38 |
| 31.38 | 2.85 | 45 |
| 33.41 | 2.68 | 11 |
| 34.32 | 2.61 | 2 |
| 35.83 | 2.51 | 8 |
| 36.09 | 2.49 | 13 |
| 39.26 | 2.30 | 2 |
| 40.81 | 2.21 | 6 |
| 42.61 | 2.12 | 5 |
| 43.33 | 2.09 | 3 |
| 45.58 | 1.99 | 2 |
| 46.30 | 1.96 | 2 |
| 48.17 | 1.89 | 8 |
| 48.84 | 1.86 | 2 |
| 49.61 | 1.84 | 4 |
| 51.44 | 1.78 | 8 |
| 51.58 | 1.77 | 5 |
| 52.29 | 1.75 | 2 |
| 53.68 | 1.71 | 3 |
| 55.40 | 1.66 | 9 |
| 58.03 | 1.59 | 5 |
| 60.82 | 1.52 | 1 |
| 61.48 | 1.51 | 2 |
| 63.29 | 1.47 | 3 |
| 66.24 | 1.41 | 1 |
| 67.65 | 1.38 | 3 |

Zeolite T may be prepared by preparing an aqueous sodium-potassium aluminosilicate mixture having a composition, expressed in terms of mole ratios of oxides, falling within the following range:

| $Na_2O/(Na_2O+K_2O)$ | From about 0.7 to about 0.8. |
|---|---|
| $(Na_2O+K_2O)/SiO_2$ | From about 0.4 to about 0.5. |
| $SiO_2/Al_2O_3$ | About 20 to 28. |
| $SiO_2/(Na_2O+K_2O)$ | About 40 to 42. | maintaining the mixture at a temperature of about 100° C. until crystallization occurs, and separating the crystals from the mother liquid.

Several methods are available for incorporating the iron, cobalt and nickel in the zeolitic molecular sieves. The first of these comprises intimately contacting the zeolitic molecular sieve with an aqueous solution of a water-soluble salt of the metal to be deposited in the inner adsorption area of the zeolitic molecular sieve whereby ion-exchange of the metal cations of the zeolitic molecular sieve in the aqueous solution occurs; separating the zeolitic molecular sieve from the aqueous exchanging solution; drying the zeolitic molecular sieve whereby substantially all of the water is removed from the zeolitic molecular sieve; and intimately contacting the zeolitic molecular sieve with a reducing agent such as alkali metal vapors or gaseous hydrogen whereby the cations of the metal to be deposited, i.e., the iron, nickel and/or cobalt, are reduced to the elemental metal.

In an example of this method of preparation, 100 grams of zeolite X were placed in a 16 millimeter (inside diameter) glass column to a bed depth of 70 centimeters. A 0.22 molar nickel-nitrate solution (128 grams $Ni(NO_3)_2 \cdot 6H_2O$ in two liters of water)

was passed upwards through this column at a rate of 10 milliliters per minute. The zeolite was washed after completion of exchange by passing 500 milliliters of distilled water through the column. The zeolite was then removed from the column and dried at 100° C. X-ray diffraction analysis of the dried product showed the crystal structure to be intact.

The nickel-exchanged zeolite was placed in a vertical tube and heated under a hydrogen purge of 0.5 cubic feet per hour at 300° C. to 350° C. for 3 hours until dehydrated. The temperature was then increased to 500° C. for 3 hours while still under the hydrogen purge to accomplish hydrogen reduction of the nickel-exchanged zeolite. The zeolite was then cooled overnight under 5 p.s.i.g. hydrogen. The product was uniformly black. Chemical analysis of the product indicated 8.6 weight-percent of nickel.

In another example of this method of preparation a solution of iron nitrate was prepared by dissolving 20.2 grams of iron nitrate ($Fe(NO_3)_3 \cdot 9H_2O$) in one liter of distilled water. The solution was slurried with 100 grams of zeolite X and allowed to stand for 10 minutes. The zeolite was filtered and dried at 100° C. for 3 hours. The iron-exchanged zeolite containing 2.4 weight-percent iron was then placed in a horizontal tube furnace and heated under 2 cubic feet per hour of hydrogen at 300° C. to 320° C. for 10 hours. The bed color changed from yellow-brown to gray-brown. Chemical analysis of the product indicated 3.2 weight-percent iron.

Another method for incorporating the metal within the zeolitic molecular sieve comprises contacting the zeolitic molecular sieve with an aqueous solution of a metal-amine, complex cation of iron, cobalt or nickel whereby ion-exchange occurs between the complex cations and the exchangeable cations of the zeolitic molecular sieve; drying the ion-exchanged zeolitic molecular sieve; activating the dried, ion-exchanged zeolitic molecular sieve in an inert atmosphere; reducing the complex cations in the activated zeolitic molecular sieve by heating the zeolitic molecular sieve up to a temperature of about 350° C. in a flowing stream of an inert dried gas or in vacuum, whereby the complex cation is destroyed thereby depositing the metal in a very highly dispersed form in the inner adsorption area of the zeolitic molecular sieve; and cooling the product. To achieve the highest activity, the product is further heated in hydrogen after destroying the complex action. This method is limited to the loading of zeolitic molecular sieves which has a pore size sufficiently large to permit adsorption of benzene. Molecular sieves having smaller pores will not satisfactorily permit entry of the metal-amine complex cations into the inner adsorption area of the crystal.

It may be seen that the maximum metal that may be incorporated in the zeolitic molecular sieves in the foregoing ion-exchange processes is limited by the extent to which the molecular sieves may be ion-exchanged with the desired cations. However, since the metal is distributed throughout the molecular sieves according to the location of the ion-exchange site of the crystals it is possible to obtain a high degree of dispersion of the metal throughout the crystals and the contained metal has a very high specific surface.

Still another method which is suitable for preparation of the metal loaded zeolitic molecular sieves comprises intimately contacting an activated zeolite molecular sieve in an inert atmosphere with decomposable fluid compound of iron, nickel or cobalt whereby the decomposable compound is adsorbed by the zeolitic molecular sieve in its inner adsorption region. The decomposable compound may then be decomposed whereby the elemental metal is deposited and retained in the inner adsorption region. As with the foregoing method wherein ion-exchange with complex cations is employed, this process is limited to the loading of molecular sieves which are capable of adsorbing benzene.

Iron, nickel or cobalt carbonyls or carbonyl hydrides are suitable as the decomposable fluid compounds. The reduction of the material may be either chemical or thermal. To illustrate this method, 22.7 grams of zeolite X were activated by heating to about 350° C. The activated zeolite was treated with volatile iron pentacarbonyl under reduced pressure until adsorption of the carbonyl by the zeolite ceased. The treated material was heated slowly to 250° C. under a purging stream of nitrogen until the iron pentacarbonyl was decomposed leaving elemental iron in the crystals of zeolite X. The zeolite assumed a deep purple color. The product contained 8.1 weight-percent iron in the zeolite pores. Adsorption data indicated that the iron-loaded zeolite contained 8.2 weight-percent iron prior to the decomposition of the iron carbonyl. This agreement in iron content in the final product indicated that a negligible amount of $Fe(CO)_5$ was desorbed during decomposition and that practically quantitative decomposition took place.

A cobalt-loaded zeolitic molecular sieve was prepared by treating activated sodium zeolite X with a chloroform solution of cobalt acetylacetonate until the cobalt acetylacetonate was adsorbed. The contained acetylacetonate was then decomposed by heating the molecular sieve for four hours at a temperature of about 350° C. in a stream of hydrogen. The product contained about 0.3 weight-percent of cobalt.

In one embodiment of the present invention, an oxygen containing gas mixture is provided and contacted with a zeolitic molecular sieve containing at least one material selected from the group consisting of elemental iron, cobalt and nickel. The oxygen is sorbed from the gas mixture and is removed because of the oxidation of the elemental metal. The mechanism of reaction, as exemplified by the contact of oxygen with an iron loaded zeolite, is believed to be as follows:

$$(zeolite \cdot 2Fe) + O_2 \rightarrow (zeolite + 2FeO)$$

In most cases, the metal-loaded zeolites will remove oxygen at ambient temperatures. However, by exposing the molecular sieves to oxygen at higher temperatures, more satisfactory results will be obtained. The fact that the reaction proceeds rapidly at ambient temperature leads to the belief that the elemental metal within the molecular sieve may be present in a non-crystalline, very finely dispersed form, perhaps even as discrete atoms.

The invention is conveniently practiced by enclosing the elemental metal containing zeolitic molecular sieve in a suitable chamber, admitting the gas mixture from which the oxygen is to be removed and collecting the purified product gas at an effluent end of the zeolite containing chamber.

In an example of the invention showing the highly reactive state of the metal dispersed within the molecular sieve, an iron loaded zeolitic molecular sieve (zeolite X) was exposed to an oxygen containing gas mixture. The iron loaded zeolite was purple in color before exposure. As soon as this material was exposed to air, the color of a portion of it changed from purple to the characteristic color of iron oxide while some of the iron-loaded zeolite turned black after the exposure. It was shown by the behaviour of the material in a magnetic field that the different colors were due to the presence of different oxides of iron.

In another embodiment of the present invention, the metal-loaded zeolites are useful for removing carbon monoxide from gas streams or mixtures. For example, the nickel-loaded zeolites may be used to remove carbon monoxide from a mixture with hydrogen which latter gas is to be used in catalytic hydrogenation and ammonia synthesis.

Nickel-loaded sodium zeolite X containing about 8 percent nickel has been unexpectedly found, for example, to adsorb 11.7 weight-percent carbon monoxide at room temperature and 750 millimeters of mercury pressure of carbon monoxide. Sodium zeolite X at 0° C. and 750 mm. Hg pressure without the metal only adsorbs 5.1 weight-percent carbon monoxide (U.S. Patent 2,882,244). Thus, at a 25° C. higher temperature, wherein adsorption for the non-loaded zeolite would have decreased, the metal loaded zeolite removes over twice as much carbon monoxide. This greater adsorption shown by the nickel loaded zeolite is believed to be due to the chemical reaction of the nickel and carbon monoxide to form a nickel carbonyl. When the material is so employed, the carbon monoxide may be removed merely by elevating the temperature or lowering the pressure or a combination of these to decompose the formed nickel carbonyl. For example, nickel carbonyl will decompose to elemental nickel and carbon monoxide upon heating to above about 175° C. Thus, the material may be used in cyclic processes by adsorbing and desorbing the carbon monoxide.

In such a process, it is important to maintain the contact step for adsorption at a temperature substantially below the decomposition temperature of the formed carbonyl. Thus, for the present invention, a temperature of contact below 100° C. is desirable. The usual alumina and aluminosilicates coated with nickel are not useful in this manner because such supports do not leave the metal in a fine enough dispersion to allow all the metal to react with the carbon monoxide and form the carbonyl and secondly because the nickel carbonyl which is formed is evolved in the desorption step instead of just the carbon monoxide. In the present process, primarily carbon monoxide is evolved on desorption. This is believed due to the strong bonding forces of the zeolitic molecular sieve which prevent the desorption of the nickel and nickel carbonyl.

It is believed, as was previously disclosed, that the metal exists either as free atoms or agglomerates of near atomic dimensions dispersed throughout the internal pore system of the zeolite. Assuming this to be true, it would be expected that most of the metal would be free to reform the carbonyl on adsorption of carbon monoxide. However, if the metal were present as crystals or small crystallites on the surface, it would be expected that only a small portion of the metal would be available to reform the carbonyl. Thus, the amount of carbon monoxide taken up to reform the carbonyl should be an indicator of the state of the metal. It was found that a nickel-loaded sodium zeolite X, loaded by the adsorption and decomposition of nickel tetracarbonyl, took up 78 percent of the carbon monoxide necessary to completely form the tetracarbonyl with all the metal. It was also found that this carbon monoxide uptake was quite rapid.

In an example of the invention, nickel-loaded sodium zeolite X in the form of 14 x 30 mesh particles was placed in a bed 1 inch in diameter and 8 inches long. A gas mixture was prepared containing approximately 2 percent carbon monoxide in hydrogen. The gas was passed through the adsorption bed at a linear velocity of 2 ft. per minute. The exit gas from the bed was analyzed for carbon monoxide with both a thermal conductivity cell and a carbon monoxide tester. It was found that at room temperature the carbon monoxide was reduced from 2 percent to an undetectable amount (less than 5 p.p.m.). Breakthrough occurred at an adsorbent loading of 11 percent carbon monoxide.

This application is a continuation-in-part of application Serial No. 136,999, filed September 11, 1961, which itself is a continuation of application Serial No. 762,956, filed Sept. 24, 1958, now abandoned. Serial No. 136,999 issued December 19, 1961, as U.S. Patent No. 3,013,990.

What is claimed is:

1. A process for removing carbon monoxide from a carbon monoxide containing gas mixture which comprises contacting said carbon monoxide containing gas mixture with a zeolitic molecular sieve containing in the inner adsorption region at least one finely dispersed elemental metal selected from the group consisting of iron, nickel and cobalt at a temperature below about 100° C. but sufficient to form a carbonyl of the selected metal and thereby removing said carbon monoxide from said carbon monoxide containing gas mixture; thereafter decomposing the metal carbonyl and evolving the resulting carbon monoxide while retaining said selected metal within the inner adsorption region.

2. A process as described in claim 1 wherein the metal carbonyl is decomposed by heating.

3. A process as described in claim 1 wherein the metal carbonyl is decomposed by lowering the pressure on the metal carbonyl-containing molecular sieve.

4. A process as described in claim 1 wherein the molecular sieve is zeolite X.

5. A process as described in claim 1 wherein the finely divided elemental metal is nickel.

6. A process for removing carbon monoxide from a carbon monoxide-containing gas mixture which comprises contacting the gas mixture with zeolite X having finely dispersed elemental nickel within its inner adsorption region, said contact being at temperature below 100° C. but sufficient to form nickel carbonyl thereby removing said carbon monoxide from the gas mixture; thereafter heating the nickel carbonyl-containing zeolite X to temperature above 175° C. thereby decomposing the carbonyl and evolving the resulting carbon monoxide while retaining the nickel within the inner adsorption region.

7. A process as described in claim in which the gas mixture is hydrogen containing carbon monoxide.

References Cited by the Examiner

UNITED STATES PATENTS

| | | | |
|---|---|---|---|
| 2,882,243 | 4/59 | Milton | 23—113 |
| 2,882,244 | 4/59 | Milton | 23—113 |
| 3,033,642 | 5/62 | Bukata et al. | 23—2 |

OTHER REFERENCES

Mellor: "A Comprehensive Treatise on Inorganic and Theoretical Chemistry," Longmans, Green and Co., New York, New York, vol. 1, 1922, page 376, and vol. 5, 1924, pages 953–961.

MAURICE A. BRINDISI, *Primary Examiner.*